T. P. SHAFFNER.
Electro Magnet.
No. 60,432.
Patented Dec. 11, 1866.
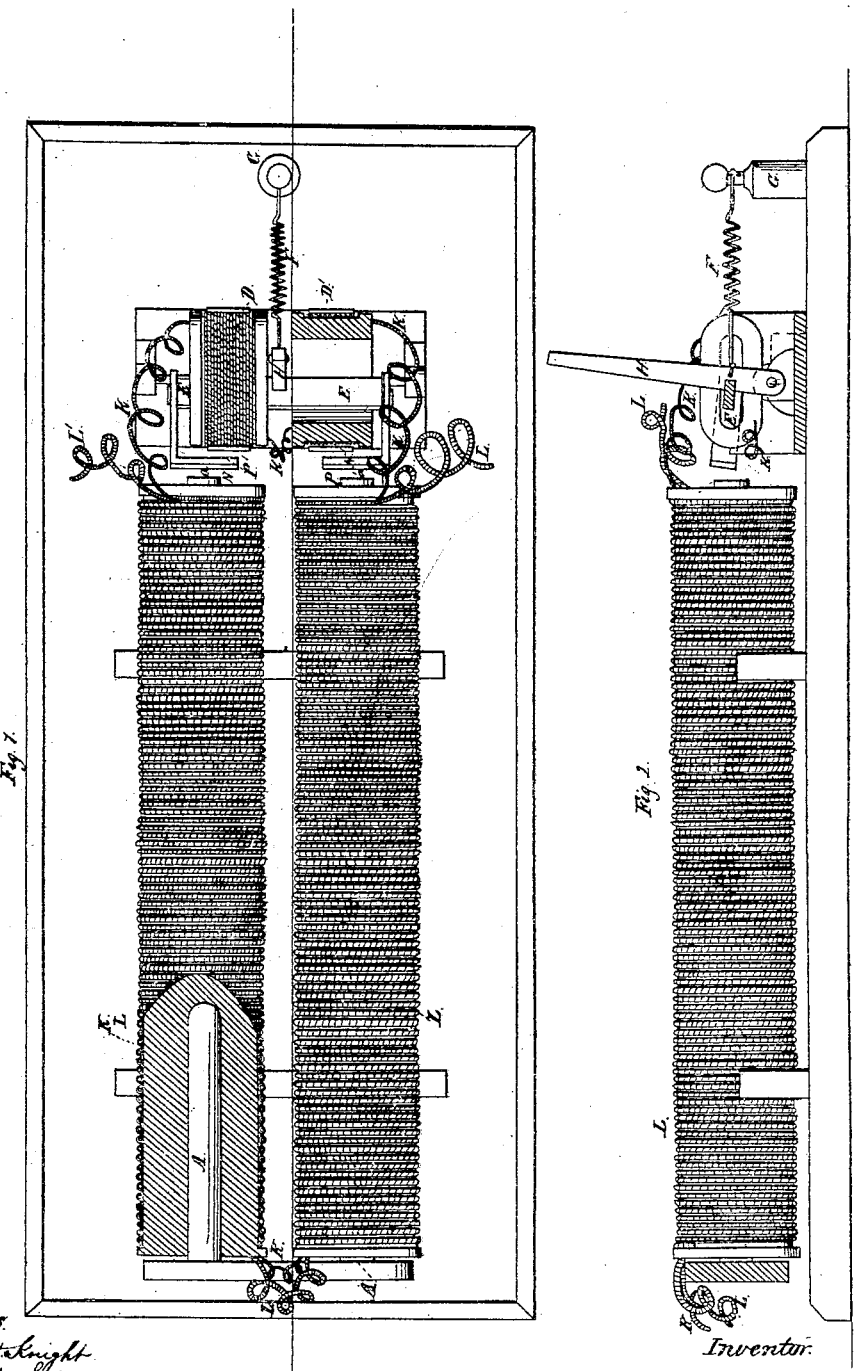

United States Patent Office.

IMPROVEMENT IN MAGNETS FOR TELEGRAPHS.

TAL. P. SHAFFNER, OF LOUISVILLE, KENTUCKY.

Letters Patent No. 60,432, dated December 11, 1866; antedated November 25, 1866.

*The Schedule referred to in these Letters Patent and making part of the same.*

TO ALL WHOM IT MAY CONCERN:

Be it known that I, TALIAFERRO P. SHAFFNER, of the city of Louisville, in the county of Jefferson, and State of Kentucky, have made new and useful improvements in electro magnets, which I term Electro Inductive Polar Magnet; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which my improvement is represented by a plan or top view.

My improvement consists in the construction of an electro magnet of a horse-shoe shape, wound with copper wire, say, for example, No. 22 wire, with alternate convolutions of smaller wire, say No. 32 wire, each insulated from the other by silk or other equivalent non-conductor, the large wire being connected with the two poles of a voltaic battery or other generator of electricity. The smaller wire is not connected with the main or larger wire, and after having followed each convolution of the large wire from the soft iron core, layer by layer to the outside of the spool or bobbin, from thence the two ends are taken to hollow bobbins, through which is passed the armature of the magnet; these hollow bobbins are wound by a series of convolutions of the small wire, thereby making a circuit of the small wire first around the magnet cores, and then around the hollow bobbins above referred to. The armature of this improved electro magnet is held up by an upright lever fixed to an axle, as usual in instruments of this character, but the armature is so constructed as to move to and fro through the hollows of the bobbins, and in such shape as to present a metallic face to the ends of the cores of the magnet, and the bobbins are to be so wound that the electricity will produce the poles of the magnet under the armature of opposite force, that is to say, the negative pole of the magnet shall be faced by the positive pole of the magnetized armature, while the positive pole of the magnet is faced by the negative pole of the magnetized armature, bringing into action the well known principle that opposite poles attract each other. The passage of the voltaic current over the main or larger wire magnetizing the cores of the magnet, the smaller wire becomes charged with induced electricity, which, when surrounding the hollow bobbins, makes an electro magnet of the armature, and in this manner polarity is given to the soft iron cores of the magnet and the soft iron armature. The result of this improvement is, that the slightest presence of electricity surrounding the magnet will effect the movement of the armature, and thus perfect telegraphic communication, while, on the other hand, the magnets heretofore used, not having the polarity above described, cannot perfect telegraphic communication with so small an electric force; and another important consideration is accomplished, namely, the increased conductivity of the copper wire in the main circuit surrounding the core, lessening the resistance on a given line at every office or station, thus enabling the circuit of the line to be considerably increased, possibly one-third farther. Again, the risk of the destruction by lightning of the electro magnets in the main circuit of the line is lessened. The larger and smaller wires may be associated together around the core of the magnet, or may form an inductive coil aside from it.

In the drawings, A A are the soft iron cores of the magnet, around which are wrapped the larger or main-line wires, L, and the secondary or smaller wires, K; these wires are all insulated and wrapped in the immediate vicinity of each other around the cores in a manner familiar to electricians. The continuation, L,' of the wire L passing to the earth. The secondary wire K, after being successively wrapped around the cores A A, is passed to a frame of non-magnetic material, round which it is wrapped, forming a coil, D, thereon, and then to a second frame, where it forms the coil D', from whence it is conducted to the magnet again, completing the circuit. Supported upon the upright lever H is an armature, E, upon whose ends are plates, N' P', which are opposed, both in position and polarity, to the adjacent ends, a a', of the cores A A. The spring F is connected to the post G, to restore armature E to its normal or unmagnetized position in the hollow coils D D', the position shown in the drawings.

I do not claim using inductive electricity for telegraphic purposes, for that has long been known, as, for instance, the instruments of Bright about the year 1850, Henly and others about the year 1852, in which an induced current has been made in some form the means of transmitting telegraphic intelligence; but what I claim as new, and desire to secure by Letters Patent, is—

Making an electro magnet of the armature by means of a current induced by the main circuit, substantially as herein set forth, in connection with the electro magnet A A, or its equivalent, for telegraphic purposes.

TAL. P. SHAFFNER.

Witnesses:
EDWARD H. KNIGHT,
JOHN A. WIEDERSHEIM.